United States Patent
Boscan Guerra et al.

(10) Patent No.: US 11,802,188 B2
(45) Date of Patent: Oct. 31, 2023

(54) ACID-FUNCTIONAL COPOLYMER COATINGS FOR POLYMERIC SUBSTRATES

(71) Applicant: Michelman, Inc., Cincinnati, OH (US)

(72) Inventors: Freddy Enrique Boscan Guerra, Recklinghausen (DE); Robin Cooper, Attert (BE); Guillaume Putod, Arlon (BE); Rymma Sushko, Windhof (LU)

(73) Assignee: Michelman, Inc., Cincinnati, OH (US)

( * ) Notice: Subject to any disclaimer, the term of this patent is extended or adjusted under 35 U.S.C. 154(b) by 349 days.

(21) Appl. No.: 17/251,031

(22) PCT Filed: Jun. 12, 2019

(86) PCT No.: PCT/US2019/036822
§ 371 (c)(1),
(2) Date: Dec. 10, 2020

(87) PCT Pub. No.: WO2019/241421
PCT Pub. Date: Dec. 19, 2019

(65) Prior Publication Data
US 2021/0246277 A1   Aug. 12, 2021

Related U.S. Application Data

(60) Provisional application No. 62/684,368, filed on Jun. 13, 2018.

(51) Int. Cl.
   *C08J 7/048*   (2020.01)
   *C08J 7/04*    (2020.01)
   *C09D 125/14*  (2006.01)

(52) U.S. Cl.
   CPC ............ *C08J 7/0423* (2020.01); *C08J 7/048* (2020.01); *C09D 125/14* (2013.01); *C08J 2367/02* (2013.01); *C08J 2425/06* (2013.01)

(58) Field of Classification Search
   USPC .................................................... 428/477.7
   See application file for complete search history.

(56) References Cited

U.S. PATENT DOCUMENTS

| 2010/0062117 A1 | 3/2010 | Ilsley et al. |
| 2017/0183467 A1 | 6/2017 | Kravitz |

FOREIGN PATENT DOCUMENTS

| JP | 2012056311 A | * | 3/2012 |
| JP | 2012056311 A | | 3/2012 |
| WO | 20180107177 A1 | | 6/2018 |

OTHER PUBLICATIONS

JP-2012056311-A machine translation Hirota et. al (Year: 2012).*
ISRWO for related application PCT/US2019/036822 dated Apr. 9, 2019.

* cited by examiner

*Primary Examiner* — Terressa Boykin
(74) *Attorney, Agent, or Firm* — Vorys, Sater, Seymour and Pease LLP

(57) ABSTRACT

Embodiments of the present disclosure provide a coated film structure including a substrate layer, an overcoat layer, and at least one intermediate layer disposed between the substrate layer and the overcoat layer. The substrate layer includes a polymer film substrate, the overcoat layer includes an acid-functional copolymer, and the at least one intermediate layer includes aluminum oxide. The coated film structure has an oxygen transmission rate of less than about 3.00 $cm^3/m^2$/day at 50% relative humidity and 23° C. as measured in accordance with ASTM D3985. Further, the coated film structure has a water vapor transmission rate of less than 2.50 $g/m^2$/day at 90% relative humidity and 37.8° C. as measured in accordance with ASTM E-398.

20 Claims, 4 Drawing Sheets

ACID-FUNCTIONAL COPOLYMER COATINGS FOR POLYMERIC SUBSTRATES

TECHNICAL FIELD

Embodiments of the present disclosure are generally related to coatings for use on film substrates. More specifically, embodiments of the present disclosure are related to coated film structures including a layer comprising aluminum oxide and a layer comprising a styrene copolymer, which have improved oxygen and water vapor barrier properties.

BACKGROUND

Polymeric film substrates may be coated with various materials to impart various desired properties to the substrates. These properties include, but are not limited to, sealability, water and grease resistance, adhesion, and tear or puncture resistance. In some instances, the coating materials may incorporate metals or metal oxides. These types of coatings are particularly important in the flexible packaging industry, which may utilize polymeric film substrates. Packaging items such as pouches and bags used for storing food may involve polymeric film substrates. In these items, barrier properties may be desired in the polymeric film substrates to improve durability of the package and quality and shelf life of the package contents.

Metal and metal oxide coatings are used to improve the barrier of plastic films used in packaging. However, the performance of these coatings tends to diminish during processing of the film. For example, the film is kept under tension when it is wound and unwound during printing and lamination processes. The tension can cause cracking of the coatings deposited on the film. Additionally, the surface of the film is also in contact with rollers and guides that can abrade and scratch the coatings. These damages to the coating can affect the barrier properties of the coated polymeric films with regards to water vapor and oxygen transmission rates.

SUMMARY

Accordingly, there is a continual need for a coated film structure that exhibits improved barrier performance to water vapor and oxygen. Moreover, there is a need for a coated film structure, which includes aluminum oxide that exhibits favorable water vapor and oxygen transmission rates. The embodiments of the present disclosure meet these needs.

Embodiments of the present disclosure provide a coated film structure including a substrate layer, an overcoat layer, and at least one intermediate layer disposed between the substrate layer and the overcoat layer. The substrate layer includes a polymer film substrate, the overcoat layer includes at least one acid-functional copolymer, and at least one intermediate layer includes aluminum oxide.

According to one or more embodiments, the coated film structure has an oxygen transmission rate of less than about 3.00 cm$^3$/m$^2$/day at 50% relative humidity and 23° C. as measured in accordance with ASTM D3985. Further, the coated film structure has a water vapor transmission rate of less than 2.50 g/m$^2$/day at 90% relative humidity and 37.8° C. as measured in accordance with ASTM E-398. In some particular embodiments, the coated film structure has an oxygen transmission rate of less than about 1.00 cm$^3$/m$^2$/day at 50% relative humidity and 23° C. as measured in accordance with ASTM D3985 and a water vapor transmission rate of less than 1.00 g/m$^2$/day at 90% relative humidity and 37.8° C. as measured in accordance with ASTM E-398.

According to one or more embodiments, the acid-functional copolymer is a hydrophobic styrene copolymer. In various embodiments, the hydrophobic styrene copolymer is selected from the group of styrene-acrylic copolymers stabilized with alkali-soluble resins (ASR), acid-functional styrene-acrylic copolymers, alkali-soluble acrylic copolymers, and carboxylated styrene-butadiene rubber (SBR) dispersions.

BRIEF DESCRIPTION OF DRAWINGS

The following detailed description of specific embodiments of the present disclosure can be best understood when read in conjunction with the following drawings, where aspects of the structure are indicated with corresponding reference numerals and in which.

DETAILED DESCRIPTION

Figure 1:
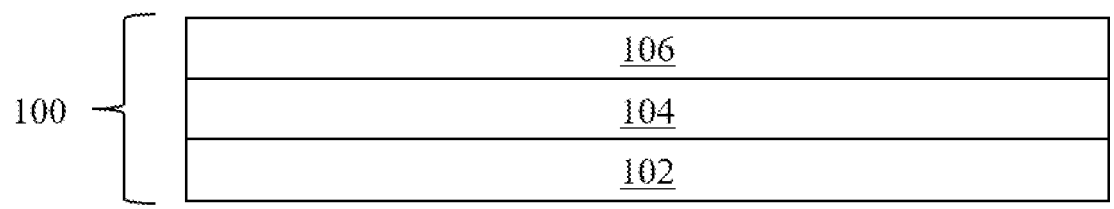
FIG. 1 schematically depicts a cross-sectional side view of a coated film structure, according to one or more embodiments described herein.

Reference will now be made in detail to various embodiments of the coated structures. The components of the coated film structure include a first substrate layer including at least one polymer film, an intermediate layer including aluminum oxide, and an overcoat layer including an acid-functional copolymer. The coated film structures of various embodiments may exhibit increased barrier performance to moisture vapor and oxygen.

In various embodiments, the substrate layer includes at least one polymer film substrate. The polymer film substrate may be a polyester, a polyamide, or a polyolefin. For example, the substrate may include at least one polyethylene or polypropylene, a polyester substrate, or combinations thereof. By way of example and not limitation, the polymer film may comprise polyethylene, polypropylene, biaxially oriented polyethylene terephthalate (BOPET), biaxially oriented polypropylene (BOPP), polylactic acid (PLA), polyhydroxyalkanoate (PHA), polypropylene, biaxially oriented polyamide, nylon, or polyvinyl chloride. In certain embodiments, the polymer substrate includes polyester, such as BOPET. According to other embodiments, the polymer substrate includes a polypropylene. Suitable polypropylenes include, but are not limited to, BOPP.

In one or more embodiments, the substrate layer has a thickness from 1 μm to 120 μm. In other embodiments, the substrate layer has a thickness from 1 μm to 100 μm, from 1 μm to 80 μm, from 1 μm to 60 μm, from 1 μm to 50 μm, from 5 μm to 120 μm, from 5 μm to 100 μm, from 5 μm to 80 μm, from 5 μm to 60 μm, from 5 μm to 50 μm, from 10 μm to 120 μm, from 10 μm to 100 μm, from 10 μm to 80 μm, from 10 μm to 50 μm, or from 10 μm to 30 μm. Coated film structures that have too thin of a substrate layer may be more susceptible to punctures or tears. Coated film structures that have too thick of a substrate layer may have inadequate flexibility and the coatings may be less durable to deformation.

One or both of the surfaces of the polymer film substrate may be surface-treated. Surface treatments may, for example, improve receptivity of the polymer film substrate to metallization, coatings, printing inks, lamination, or combinations thereof. By way of example and not limitation, one or both surfaces of the polymer film substrate may be subjected to one or more of a corona discharge treatment, a flame treatment, a plasma treatment, a chemical treatment, or the like. Chemical treatments include chemical etching with acids, bases, or oxidizing agents. The chemical treatment used for chemical etching may include nitric acid, potassium chromate, trichloric acid, or combinations thereof.

The coated film structure of various embodiments includes at least one overcoat layer including an acid-functional copolymer. As used herein, the term "acid-functional copolymer" refers to a copolymer that includes at least one comonomer including one or more acid-functional groups. In some embodiments, the acid-functional copolymer is an alkali-soluble stabilizing resin used to prepare a styrene-acrylic copolymer. Examples of monomers including one or more acid-functional groups include, but are not limited to, acrylic acid, methacrylic acid, β-carboxyethyl acrylate, fumaric acid, maleic acid, and monoalkyl esters of dibasic acid/anhydrides. In various embodiments, the acid-functional copolymer includes an acrylic acid comonomer.

In various embodiments, barrier functionality for resistance to water can be measured by the Cobb Sizing Test, as defined in ASTM D-3285 (TAPPI T-441). In various embodiments, the coated substrate exhibits a Cobb Value (30 minute exposure) less than or equal to about 30, less than or equal to about 20, or less than or equal to about 10 after a Cobb test of 30 minutes duration. The acid-functional copolymer can be, by way of example and not limitation, a carboxylated styrene-butadiene rubber (SBR), an acid-functional styrene-acrylic copolymer, an alkali-soluble acrylic copolymer, or a styrene (meth)acrylic polymer stabilized with alkali-soluble resins, such as those described in U.S. Pat. No. 4,954,558 entitled "Resin-fortified emulsion polymers and method of preparing the same," issued Sep. 4, 1990, the entire disclosure of which is hereby incorporated by reference. In some embodiments, the acid-functional copolymer may be prepared in accordance with the teachings of U.S. Pat. No. 4,414,370 entitled "Process for continuous bulk copolymerization of vinyl monomers," issued Nov. 8, 1983, U.S. Pat. No. 4,529,787 entitled "Bulk polymerization process for preparing high solids and uniform copolymers," issued Jul. 16, 1985, and U.S. Pat. No. 4,546,160 entitled "Bulk polymerization process for preparing high solids and uniform copolymers," issued Oct. 8, 1985, all of which are incorporated herein by reference.

In some embodiments, the acid-functional copolymer is a copolymer including an acrylic comonomer and a styrene comonomer. The acid-functional copolymer can include, for example, from about 10 wt % to about 99 wt % styrene, from about 10 wt % to about 30 wt % styrene, from about 10 wt % to about 20 wt % styrene, from about 20 wt % to about 30 wt % styrene, from about 30 wt % to about 50 wt % styrene, from about 40 wt % to about 60 wt % styrene, or about from about 80 wt % to about 99 wt % styrene. The acid-functional copolymer can include, for example, from about 1 wt % to about 90 wt % acrylic comonomer, from about 1 wt % to about 20 wt % acrylic comonomer, from about 50 wt % to about 60 wt % acrylic comonomer, from about 70 wt % to about 90 wt % acrylic comonomer, or from about 40 wt % to about 60 wt % acrylic comonomer. Other amounts of styrene and acrylic comonomers are contemplated, depending on the particular embodiment.

The amount of styrene in particular can impact the glass transition temperature (Tg) of the acid-functional copolymer. In particular, as the styrene content of the acid-functional copolymer increases, the Tg of the acid-functional copolymer also increases. In various embodiments, the acid-functional copolymer has a Tg of from about −25° C. to about 130° C., from about −25° C. to about 110° C., from about 0° C. to about 130° C., from about 0° C. to about 120° C., from about −20° C. to about 90° C., from about −10° C. to about 50° C., or even from about −5° C. to about 20° C.

In various embodiments, the acid-functional copolymer has an acid value of about 2 mgKOH/g to about 240 mgKOH/g, from about 2 mgKOH/g to about 76 mgKOH/g, from about 4 mgKOH/g to about 50 mgKOH/g, or from about 30 mgKOH/g to about 45 mgKOH/g. In some embodiments, such as embodiments in which the acid-functional copolymer is an alkali soluble acrylic copolymer, the acid value may be from about 50 mgKOH/g to about 240 mgKOH/g. In various embodiments, the acid-functional copolymer has a molecular weight (MW) of greater than about 100,000 g/mol, greater than about 150,000 g/mol, or even greater than about 200,000 g/mol. In still other embodiments, such as embodiments in which the acid-functional copolymer is an alkali soluble acrylic copolymer, the molecular weight may be from about 2,000 g/mol to about 17,000 g/mol.

In some embodiments of the present disclosure, the overcoat layer may further include a crosslinker. The crosslinker may comprise a multivalent metal salt. For example, the crosslinker may be a transition metal ion. The crosslinker may, in some embodiments, comprise a metal oxide, such as zirconium oxide, zinc oxide, iron oxide, aluminum oxide, copper oxide, and complexes thereof.

In some embodiments, the amount of crosslinker can vary depending on the acid functionality of the acid-functional copolymer. In particular, according to some embodiments, a ratio of moles of crosslinker to acid functionality of the acid-functional copolymer is less than about 1:1. For example, the ratio of moles of crosslinker to acid functionality of the acid-functional copolymer can be from about 0.1:10 to about 7:10, from about 0.5:10 to about 7:10, or from about 3:10 to about 7:10.

The overcoat layer may also optionally include one or more other additives, including, but not limited to, biocides, thickeners (also referred to herein as rheology modifiers), defoamers, plasticizers, and/or co-solvents, including but not limited to alcohols. Suitable biocides may include, by way of example and not limitation, those commercially available under the trade name PROXEL®, including PROXEL® GXL 5%, available from Lonza Group (Basel, Switzerland).

In some embodiments, the overcoat layer includes a thickener selected from the group consisting of water swellable polymers. The particular amount of thickeners included in the overcoat layer can vary depending on the particular embodiment, and can depend on, among other factors, the type of thickener used as well as the desired viscosity of the overcoat layer. Water swellable polymers can be selected from the group consisting of natural, semi-synthetic or synthetic water swellable polymers, such as polyacrylates, polymethacrylates, polyacrylamides, polymethacrylamides, polyurethanes and co-polymers thereof, polysaccharides, cellulose ethers, gums, and mixtures thereof. In some embodiments, the thickener may be selected from the group consisting of inorganic clays, cellulosic polysaccharides, synthetic hydrocarbon polymers, biopolymer polysaccharides, acrylic copolymers, polyacrylate ammonium salts, polyether carboxylate polymers, non-associative thickeners and associative thickeners, and base-neutralized ethylene acrylic acid copolymers.

In one or more embodiments, the overcoat layer has a dry coat weight of from about 0.05 $g/m^2$ to about 2.0 $g/m^2$. In other embodiments, the overcoat layer has a dry coat weight of from about 0.05 $g/m^2$ to about 1.5 $g/m^2$; from about 0.1 $g/m^2$ to about 1.0 $g/m^2$; or from about 0.2 $g/m^2$ to about 0.5 $g/m^2$. In further embodiments, the overcoat layer may comprise at least 50% by dry coat weight of acid-functional copolymer, or at least 60 by dry coat weight of acid-functional copolymer. Said another way, in other embodiments, the overcoat layer may comprise from 60 to 100% by dry coat weight of acid-functional copolymer.

Referring to FIG. 1, in one or more embodiments, a coated film structure 100 comprises at least one intermediate layer 104 disposed between the substrate layer 102 and the overcoat layer 106. The intermediate layer 104 may be, for example, disposed on the substrate layer 102. The intermediate layer 104 may be in contact with the substrate layer 102, the overcoat layer 106, or both.

According to one or more embodiments, the intermediate layer 104 may include metals, metal oxides, or both. In at least one embodiment, the intermediate layer 104 comprises aluminum oxide. The intermediate layer 104 may have a thickness of from about 5 nm to about 30 nm, from about 5 nm to about 25 nm, from about 5 nm to about 15 nm, or from about 5 nm to about 10 nm.

In various embodiments, the coated film structure may further comprise at least one coating layer 108. In at least one embodiment, at least one coating layer 108 is located between the polymer film substrate and the intermediate layer 104. In other embodiments, at least one additional coating layer 108 may be applied to the overcoat layer 106 in such a way that the additional coating layer 108 does not contact the substrate or intermediate layer 104. In still other embodiments, two or more additional coating layers 108 may be included in the coated film structure. The additional coating layer 108 may be, for example, one of the overcoat formulations described above and applied between the polymer film substrate and the intermediate layer 104. The additional coating layer 108 may include, for example, a polyvinyl alcohol, a polyurethane, a polyolefin or mixtures thereof. Similar to the overcoat layer 106, the additional coating layer 108 may optionally include one or more additives, such as biocides, adhesion enhancers, crosslinking agents, or the like. In embodiments in which an additional coating layer 108 and an overcoat layer 106 are employed, the additional coating layer 108 and the overcoat layer 106 may have the same formulation, or may have different formulations.

Figure 2:
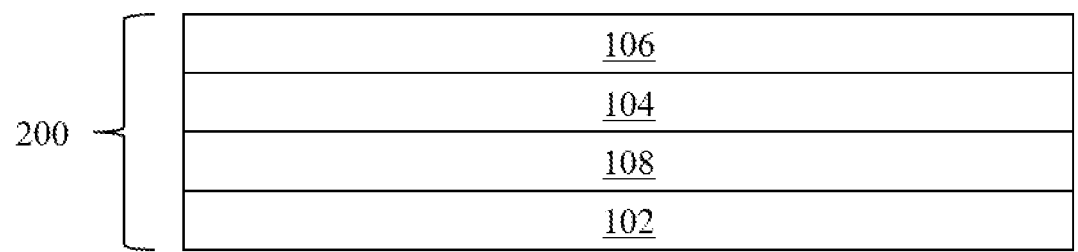
FIG. 2 schematically depicts a cross-sectional side view of a coated film structure according to one or more embodiments described herein.

Referring to FIG. 2, in one or more embodiments, a coated film structure 200 comprises a substrate layer 102, a coating layer 108, an intermediate layer 104, and an overcoat layer 106. The coating layer 108 is disposed between the intermediate layer 104 and the substrate layer 102 such that it does not contact the overcoat layer 106. Still referring to FIG. 2, the intermediate layer 104 is not in contact with the substrate layer 102 because of the placement of the intervening coating layer 108.

In one or more embodiments, the at least one coating layer 108 has a dry coat weight of from about 0.05 $g/m^2$ to about 1.5 $g/m^2$. In other embodiments, the at least one coating layer 108 has a dry coat weight of from about 0.05 $g/m^2$ to about 1.0 $g/m^2$; from about 0.1 $g/m^2$ to about 0.5 $g/m^2$; or from about 0.3 $g/m^2$ to about 0.7 $g/m^2$. The combined coat weights of all coating layers 108 are less than or equal to about 4.5 $g/m^2$, less than or equal to about 3.0 $g/m^2$, or even less than or equal to about 2.0 $g/m^2$.

In one or more embodiments, the coated film structure further includes at least one layer including a laminate adhesive. In other embodiments, the coated film structure further comprises a second substrate layer. The laminate adhesive may be located in the overcoat layer 106 or in an additional coating layer 108. In other embodiments, the laminate adhesive may be located in a layer between the first substrate layer 102 and the second substrate layer. Laminate adhesives include polyurethane based adhesives that can be either single component or two component adhesives where the degree of crosslinking is determined for a particular end use. Suitable adhesives include, as a non-limiting example, those commercially available under the tradename Loctite LIOFOL® (including, for example, Loctite LIOFOL® LA 2760/LA 5028), available from Henkel AG & Company (Dusseldorf, Germany). Suitable adhesives also include, by way of example and not limitation, those with bond strengths between 2.5 Newtons per inch (N/inch) to 10 N/inch.

In various embodiments, the coated film structure exhibits improved barrier properties to oxygen and water vapor as compared to structures including metalized barrier layers alone. For example, various embodiments of the coated film structure exhibit oxygen transmission rates of less than about 3.00 $cm^3/m^2$/day at 50% relative humidity and 23° C. as measured in accordance with ASTM D3985. In embodiments, the coated film structure may exhibit oxygen transmission rates of less than about 2.00 $cm^3/m^2$/day at 50% relative humidity and 23° C., of less than about 1.75 $cm^3/m^2$/day at 50% relative humidity and 23° C., of less than about 1.60 $cm^3/m^2$/day at 50% relative humidity and 23° C., of less than about 1.50 $cm^3/m^2$/day at 50% relative humidity and 23° C., or of less than about 1.00 $cm^3/m^2$/day at 50% relative humidity and 23° C. as measured in accordance with ASTM D3985. For example, the coated film structure may exhibit oxygen transmission rates of from about 0.1 $cm^3/m^2$/day to about 3.00 $cm^3/m^2$/day at 50% relative humidity and 23° C., from about 0.40 $cm^3/m^2$/day to about 2.00 $cm^3/m^2$/day at 50% relative humidity and 23° C., or from about 0.60 $cm^3/m^2$/day to about 1.80 $cm^3/m^2$/day at 50% relative humidity and 23° C. as measured in accordance with ASTM D3985.

In one or more embodiments, the coated film structure has a water vapor transmission rate of less than 2.50 $g/m^2$/day at 90% relative humidity and 37.8° C. as measured in accordance with ASTM E-398. In other embodiments, the coated film structure has a water vapor transmission rate of less than 1.75 $g/m^2$/day, less than 1.50 $g/m^2$/day, less than 1.25 $g/m^2$/day, or even less than 1.00 $g/m^2$/day at 90% relative humidity and 37.8° C. as measured in accordance with ASTM E-398.

The improved barrier properties of embodiment coated film structures of the present disclosure may continue over the lifetime of the coated film structure. Gelbo flex testing (ASTM F392) measures the flex durability of flexible packaging materials. The flex durability can be quantified as the resistance of the barrier material against repetitive strain. In some embodiments, the oxygen barrier remains unchanged after 5 flexes.

Various synthesis methods are contemplated for making the coated film structures and constituent layers. The overcoat layer 106 or additional coating layers 108 may be prepared as a solution in organic solvents, inorganic solvents, or combinations thereof. Alternatively, each overcoat layer 106 or additional coating layer 108 may be prepared as an aqueous emulsion. The layer compositions, in solution or emulsion form, may be applied to the substrate or other layers of the coated film structure. In still other embodiments, the layer composition may be vaporized on applied to the coated film structure via vapor deposition.

The intermediate layer 104 may be deposited on the substrate layer 102 in any suitable way. For example, the intermediate layer 104 may be deposited on the polymer film substrate using chemical vapor deposition ("CVD"), physical vapor deposition ("PVD"), vacuum vapor deposition, or atomic layer deposition ("ALD"). In one particular embodiment, the intermediate layer 104 is deposited on the polymer film substrate by PVD.

In one embodiment, the overcoat layer 106 may be prepared by adding the constituent components to a mixing vessel and mixing at ambient temperatures until all of the components are uniform. However, it is contemplated that other methods for preparing the overcoat layer 106 may be employed, including methods of mixing the components at increased temperature, increased pressures, in the presence of solubilizing agents, or combinations thereof. As used herein, solubilizing agents include rheology modifiers, pH buffering agents, counter salts, or other compound that aid in the mixing of a uniform overcoat layer 106 composition.

The overcoat layer 106 can be applied using a gravure coating, flexographic coating, or other application methods. A reverse gravure kiss coating geometry may be used to minimize damage to the intermediate layer 104 or other layers. After the overcoat layer 106 is applied, it may be dried by hot air, radiant heat, ambiently dried, or any other suitable means to provide an adherent coated film structure. Additional coating layers 108 may also be applied and dried by similar methods.

After all layers of the coated film structure are applied, the coated film structure may be cured before its barrier properties are tested. The curing may occur ambiently or actively. Ambient curing involves leaving the coated film structure to rest at atmospheric conditions. Active curing may involve the application of heat, a vacuum, or electromagnetic radiation.

Example Embodiments

A first example embodiment is a coated film structure comprising: a substrate layer comprising a polymer film substrate; an overcoat layer comprising at least one hydrophobic styrene copolymer; and at least one intermediate layer disposed between the substrate layer and the overcoat layer, the intermediate layer comprising aluminum oxide. Said embodiment can include one or more of the following: Element 1: wherein the polymer film substrate comprises a polymer selected from the group consisting of a polyester, a polyamide, and a polyolefin; Element 2: Element 1 and wherein the polymer is selected from the group consisting of polylactic acid (PLA), polyethylene terephthalate (PET), biaxially oriented polyethylene terephthalate (BOPET), oriented polypropylene (OPP), biaxially oriented polypropylene (BOPP), cast polypropylene (CPP), polyethylene (PE), and biaxially oriented polyamide; Element 3: wherein the coated film structure has an oxygen transmission rate of less than about 3.00 cm3/m2/day at 50% relative humidity at 23° C.; Element 4: wherein the coated film structure has an oxygen transmission rate of less than about 2.00 $cm^3/m^2$/day (or about 0.1 $cm^3/m^2$/day to about 3.00 $cm^3/m^2$/day, or about 0.40 $cm^3/m^2$/day to about 2.00 $cm^3/m^2$/day, or about 0.60 $cm^3/m^2$/day to about 1.80 $cm^3/m^2$/day) at 50% relative humidity at 23° C.; Element 5: wherein the coated film structure has a water vapor transmission rate of less than 2.50 $g/m^2$/day (less than 1.75 $g/m^2$/day, less than 1.50 $g/m^2$/day, less than 1.25 $g/m^2$/day, or even less than 1.00 $g/m^2$/day) at 90% relative humidity and 37.8° C. as measured in accordance with ASTM E-398; Element 6: wherein the overcoat layer has a glass transition temperature (Tg) of less than 110° C.; Element 7: wherein the overcoat layer has a glass transition temperature (Tg) of −20° C. to 100° C.; Element 8: wherein the overcoat layer has a glass transition temperature (Tg) of −10° C. to 50° C.; Element 9: wherein the overcoat layer has a glass transition temperature (Tg) of −10° C. to 30° C.; Element 10: wherein the hydrophobic styrene copolymer is selected from the group consisting of styrene-acrylic copolymers stabilized with alkali-soluble resins (ASR), alkali-soluble acrylic copolymers, acid functional styrene-acrylic copolymers, and carboxylated styrene-butadiene rubbers (SBR); Element 11: wherein the overcoat layer further comprises a multivalent cation; Element 12: Element 11 and wherein the multivalent metal cation comprises a transition metal ion; Element 13: Element 12 and wherein the transition metal ion is selected from the group consisting of ions of zinc, zirconium, iron, and copper; Element 14: Element 11 and wherein the transition metal ion is present from about 0.1:10 to about 7:10 (or from about 0.5:10 to about 7:10, or from about 3:10 to about 7:10); Element 15: wherein the molecular weight is greater than about 100,000 g/mol (or greater than about 150,000 g/mol, or even greater than about 200,000 g/mol); and Element 16: wherein the molecular weight may be from about 2,000 g/mol to about 17,000 g/mol. Examples of combinations include, but are not limited to, Element 1 and optionally Element 2 in combination with one or more of Elements 3-16; Element 3 in combination with one or more of Elements 4-16; Element 4 in combination with one or more of Elements 5-16; Element 5 in combination with one or more of Elements 6-16; one of Elements 7-9 in combination with one or more of Elements 10-16; Element 11 and optionally one or more of Elements 12-14 in combination with one or more of Elements 15-16; and Elements 15 and 16 in combination.

EXAMPLES

In order that various embodiments may be more readily understood, reference is made to the following examples, which are intended to illustrate various embodiments, but not limit the scope thereof.

Example 1: Improved Oxygen Barrier, Moisture Barrier, and Water Resistance Properties of Coated Film Structures Various example coated film structures comprising a BOPET polymer film substrate were prepared with an aluminum oxide (AlOx) intermediate layer and a styrene acrylic overcoat. Next, oxygen transmission rates, moisture vapor transmission rates, and water resistance were compared against two comparative examples. Comparative Example A is a BOPET polymer film substrate with an AlOx coating and no overcoat. Comparative Example B is a BOPET polymer film substrate with an aluminum oxide (AlOx) intermediate layer and an amorphous polyvinyl alcohol (PVOH) overcoat including 87.6 wt % deionized water, 8.6 wt % Nippon Goshsei G-POLYMER™ AZF8035Q, 1.8 wt % CYMEL® 385 (Allnex), 0.95 wt % PEI LOXANOL® MI6730 (BASF), 0.70 wt % orthophosphoric acid 85%, 0.19 wt % formaldehyde 37%, and 0.16 wt % PROXEL® GXL 5%. The examples have an intermediate layer comprising AlOx disposed between the PET film substrate layer and the overcoat layer comprising styrene acrylic copolymer. The AlOx was applied by physical vapor deposition via thermal evaporation and reactive oxidation at a thickness of about 10 nm. All substrate films used were commercial grade packaging films with a thickness of 12 μm. The Tg and acid values of the styrene acrylic copolymer used in the styrene acrylic overcoats are summarized in Table 1.

TABLE 1

Styrene Acrylic Overcoat Formulations

| Component | Description | Tg | Acid Value (AV) (mgKOH/g) |
|---|---|---|---|
| Example 1 | NEOCRYL ™ A2092 | 8° C. | 55 |
| Example 2 | Styrene Acrylic Copolymer A | 9° C. | 32 |
| Example 3 | JONCRYL ™ 1674 available from BASF | −24° C. | 45 |
| Example 4 | JONCRYL ™ 90 available from BASF | 110° C. | 76 |

The overcoat formulations were prepared by mixing the components in a paddle mixer at room temperature until uniform. The liquid overcoat formulations were applied to the examples using a Klox proofer with a EPDM shore 50 rubber roller and a TR34 engraved roll from RK Printcoat Instruments.

The oxygen transmission rates of the coated film structure including an intermediate layer and an overcoat layer at 50% relative humidity (RH) 23° C. were measured in accordance with ASTM D3985. Humidity was applied directly to the coated side of the substrate; the other side of the substrate was maintained at 0% RH. The water vapor transmission rates were measured at 37.8° C. and 90% relative humidity in accordance with ASTM E-398. Water resistance was measured by placing a drop of water on the film and removing the drop after five (5) minutes. The film was then rated from 1 to 5, where 1 corresponds to the film being dissolved in the water and 5 corresponds to the film being unchanged by the presence of water. The oxygen transmission rates, water vapor transmission rates, and water resistance of the examples are summarized in Table 2.

TABLE 2

Experimental Data for Examples 1-4 and Comparative Examples A and B

| | Oxygen Transmission Rate at 50% RH and 23° C. (cm³/m²/day) | Water Vapor Transmission Rate at 90% RH and 37.8° C. (cm³/m²/day) | Water Resistance |
|---|---|---|---|
| Example 1 | 1.88 | 1.47 | 5 |
| Example 2 | 1.68 | 3.07 | 5 |
| Example 3 | 2.32 | 2.23 | 5 |
| Example 4 | 0.44 | 0.91 | 5 |
| Comparative Example A | 5.32 | 1.24 | N/A |
| Comparative Example B | 0.18 | 0.82 | 1 |

The data in Table 2 shows that the Examples demonstrate a marked improvement in water resistance over the Comparative Example B and improved OTR over uncoated AlOx (Comparative Example A).

Example 2: Improved Oxygen Barrier, Moisture Barrier, and Water Resistance Properties of Coated Film Structures Various example coated film structures comprising a PET polymer film substrate were prepared with an aluminum oxide (AlOx) intermediate layer and a styrene acrylic overcoat including a ZnO crosslinker (ZINPLEX 15™) in the overcoat formulation. Next, oxygen transmission rates, moisture vapor transmission rates, and water resistance were measured. The AlOx was applied by physical vapor deposition via thermal evaporation and reactive oxidation at a thickness of about 10 nm. All substrate films used were commercial grade packaging films with a thickness of 12 μm. The formulations for the styrene acrylic overcoats are summarized in Table 3, with amounts reported in weight percent.

TABLE 3

Styrene Acrylic Overcoat Formulations

| Component | Example 5 | Example 6 | Example 7 | Example 8 |
|---|---|---|---|---|
| NEOCRYL ™ A2092 | 99.75 | 0 | 0 | 0 |
| Styrene Acrylic Copolymer A | 0 | 99.75 | 0 | 0 |
| JONCRYL ™ 1674 | 0 | 0 | 99.75 | 0 |
| JONCRYL ™ 90 | 0 | 0 | 0 | 99.75 |
| ZnO ZINPLEX 15 ™ ) | 0.25 | 0.25 | 0.25 | 0.25 |

The overcoat formulations were prepared as described above with respect to Examples 1-4. The oxygen transmission rates, ater vapor transmission rates, and water resistance were measured as described above and are summarized in Table 4.

TABLE 4

Experimental Data for Examples 5-8

| | Oxygen Transmission Rate at 50% RH and 23° C. (cm³/m²/day) | Water Vapor Transmission Rate at 50% RH and 37.8° C. (cm³/m²/day) | Water Resistance |
|---|---|---|---|
| Example 5 | 1.42 | 1.00 | 5 |
| Example 6 | 1.56 | 1.52 | 5 |
| Example 7 | 2.4 | 2.13 | 5 |
| Example 8 | 0.98 | 0.83 | 5 |

A comparison of the data in Tables 2 and 4 demonstrates that for Examples 1 and 2, the OTR and the MVTR both decrease (improved barrier functionality) with the addition of the ZnO crosslinker. However, for Examples 3 and 4, the OTR increased, but the MVTR decreased, indicating an improvement in water vapor barrier functionality but a decrease in oxygen transmission barrier functionality.

Example 3

Various example coated film structures comprising a PET polymer film substrate were prepared with an aluminum oxide (AlOx) intermediate layer and a styrene acrylic overcoat optionally include a ZnO crosslinker (ZINPLEX 15™) in the overcoat formulation. The compositions of the overcoat layers are provided in Table 5.

TABLE 5

Styrene Acrylic Overcoat Formulations

| Example Number | Styrene Acrylic Component Composition | Molar Ratio of ZnO to Acid Groups |
|---|---|---|
| Example 9 | PRIMAL ™ P376 available from Dow | 0:1 (i.e., no ZnO added) |
| Example 10 | Tg = 18° C. AV = 18 mgKOH/g | 0.015:1 |
| Example 11 | stryrene acrylic copolymer emulsion 1 (SACE1) | 0:1 |
| Example 12 | Tg = 7° C. AV = 31 mgKOH/g | 0.8:1 |
| Example 13 | SACE2 Tg < 3° C. | 0:1 |
| Example 14 | AV = 31 mgKOH/g | 0.015:1 |
| Example 15 | SACE3 Tg = 9° C. | 0:1 |
| Example 16 | AV = 31 mgKOH/g | 0.018:1 |
| Example 17 | JONCRYL ™ 90 Tg = 110° C. | 0:1 |
| Example 18 | AV =76 mgKOH/g | 0.01:1 |
| Example 19 | JONCRYL ™ 1674 Tg = −24° C. | 0:1 |
| Example 20 | AV= 44 mgKOH/g | 0.02:1 |
| Example 21 | MICHEM ® Coat 95 available from Michelman | 0:1 |
| Example 22 | Tg = 8° C. AV = 55 mgKOH/g | 0.015:1 |
| Example 23 | JONCRYL ™ 77 available from BASF | 0:1 |
| Example 24 | Tg = 35° C. AV = 62 mgKOH/g | 0.015:1 |

The overcoat formulations were prepared as described above with respect to Examples 1-4. The oxygen transmission rates, water vapor transmission rates, and water resistance were measured as described above and are summarized in Table 6.

TABLE 6

Experimental Data for Examples 9-24

| | Oxygen Transmission Rate at 50% RH and 23° C. (cm³/m²/day) | Water Vapor Transmission Rate at 90% RH and 37.8° C. (cm³/m²/day) |
|---|---|---|
| Example 9 | 1.56 | 3.13 |
| Example 10 | 1.3 | 2.75 |
| Example 11 | 0.96 | 1.83 |
| Example 12 | 1.22 | 2.2 |
| Example 13 | 0.7 | 2.48 |
| Example 14 | 1.24 | 1.3 |
| Example 15 | 1.68 | 3.07 |
| Example 16 | 1.56 | 1.52 |
| Example 17 | 0.44 | 0.91 |
| Example 18 | 0.98 | 0.83 |
| Example 19 | 2.32 | 2.23 |
| Example 20 | 2.4 | 2.13 |
| Example 21 | 1.88 | 1.47 |
| Example 22 | 1.42 | 1 |
| Example 23 | 2.28 | 0.89 |
| Example 24 | 1.62 | 0.69 |

This example illustrates that zinc crosslinking can be useful in improving OTR and/or WVTR when used in styrene acrylic overcoat formulations.

Example 4

Various example coated film structures comprising a BOPET polymer film substrate were prepared with an aluminum oxide (AlOx) intermediate layer and a styrene acrylic overcoat optionally include a ZnO crosslinker (ZINPLEX 15™) in the overcoat formulation. The compositions of the overcoat layers and resultant layered film properties are provided in Table 7.

TABLE 7

Styrene Acrylic Overcoat Formulations and Experimental Data for Examples 25-47

| | Weight Ratio of ZnO to Acid Groups | Oxygen Transmission Rate at 50% RH and 23° C. (cm³/m²/day) | Water Vapor Transmission Rate at 90% RH and 37.8° C. (cm³/m²/day) |
|---|---|---|---|
| MICHEM ® Coat 95 | | | |
| Example 25 | 0:1 | 1.88 | 1.47 |
| Example 26 | 0.015:1 | 1.42 | 1.02 |
| Example 27 | 0.03:1 | 1.68 | 2.03 |
| Example 28 | 0.065:1 | 1.7 | 1.76 |
| Example 29 | 0.13:1 | 1.74 | 1.60 |
| JONCRYL ™ 1674 | | | |
| Example 30 | 0:1 | 2.32 | — |
| Example 31 | 0.025:1 | 2.32 | — |
| Example 32 | 0.05:1 | 2.04 | — |
| Example 33 | 0.1:1 | 2.02 | — |
| Example 34 | 0.2:1 | 2.62 | — |
| SACE3 | | | |
| Example 35 | 0:1 | 1.68 | 3.07 |
| Example 36 | 0.025:1 | 1.56 | 1.52 |
| Example 37 | 0.05:1 | 2.2 | 1.8 |
| Example 38 | 0.1:1 | 1.98 | 0.93 |
| Example 39 | 0.25:1 | 1.9 | 1.75 |
| Example 40 | 0.5:1 | 2.02 | 0.88 |
| Example 41 | 0.6:1 | 3.7 | 3.14 |
| Example 42 | 0.7:1 | 3.8 | 3.62 |

TABLE 7-continued

Styrene Acrylic Overcoat Formulations and
Experimental Data for Examples 25-47

|  | Weight Ratio of ZnO to Acid Groups | Oxygen Transmission Rate at 50% RH and 23° C. (cm³/m²/day) | Water Vapor Transmission Rate at 90% RH and 37.8° C. (cm³/m²/day) |
|---|---|---|---|
| JONCRYL ™ 77 | | | |
| Example 43 | 0:1 | 2.28 | 0.89 |
| Example 44 | 0.015:1 | 1.62 | 0.69 |
| Example 45 | 0.03:1 | 1.96 | 0.73 |
| Example 46 | 0.065:1 | 2.22 | 0.71 |
| Example 47 | 0.13:1 | 1.76 | 0.71 |

This example illustrates that the inclusion of ZnO crosslinkers in the overcoat formulation can improve OTR and WVTR. For many of the formulations above, it appears a preferred weight ratio of ZnO to acid groups is about 0.01 to 0.05.

Example 5

Various example coated film structures comprising a BOPET polymer film substrate were prepared with an aluminum oxide (AlOx) intermediate layer and an alkali-soluble resin overcoat optionally include a ZnO crosslinker (ZINPLEX 15™) in the overcoat formulation. The compositions of the overcoat layers and resultant layered film properties are provided in Table 8. All samples had a water resistance of 5.

TABLE 8

Alkali-Soluble Resin Overcoat Formulations and
Experimental Data for Examples 48-55

| Example Number | Alkali-Soluble Resin Composition | Molar Ratio of ZnO to Acid Groups | Oxygen Transmission Rate at 50% RH and 23° C. (cm³/m²/day) | Water Vapor Transmission Rate at 90% RH and 37.8° C. (cm³/m²/day) |
|---|---|---|---|---|
| Example 48 | JONCRY ™ 8085 available from BASF Tg = 57°C AV = 245 MW = 1750 g/mol | 0:1 | 2.34 | 0.68 |
| Example 49 | | 0.2:1 | 1.78 | 0.54 |
| Example 50 | JONCRY ™ 680SLN available from BASF Tg = 91° C. AV = 204 MW = 4500 g/mol | 0:1 | 1.52 | 0.89 |
| Example 51 | | 0.2:1 | 1.6 | 0.81 |
| Example 52 | JONCRY ™ 8078 available from BASF Tg = 101° C. AV = 245 MW = 8500 g/mol | 0:1 | 2.18 | 0.98 |
| Example 53 | | 0.2:1 | 1.4 | 0.68 |
| Example 54 | JONCRY ™ HPD71E available from BASF Tg = 120° C. AV = 222 MW = 17000 g/mol | 0:1 | 1.66 | 1.15 |
| Example 55 | | 0.2:1 | 1.68 | 0.92 |

This example illustrates that the inclusion of ZnO crosslinkers in alkali-soluble resin overcoat formulations can improve OTR and WVTR. It appears that greater acid values provide greater improvement in OTR and WVTR.

Example 5

Various example coated film structures comprising a BOPET polymer film substrate were prepared with an aluminum oxide (AlOx) intermediate layer and a carboxylated styrene-butadiene rubber overcoat optionally include a ZnO crosslinker (ZINPLEX 15™) in the overcoat formulation. The compositions of the overcoat layers and resultant layered film properties are provided in Table 9. All samples had a water resistance of 5.

TABLE 9

Carboxylated Styrene-Butadiene Rubber Overcoat Formulations
and Experimental Data for Examples 48-55

| Example Number | Alkali-Soluble Resin Composition | Molar Ratio of ZnO to Acid Groups | Oxygen Transmission Rate at 50% RH and 23° C. (cm³/m²/day) | Water Vapor Transmission Rate at 90% RH and 37.8° C. (cm³/m²/day) |
|---|---|---|---|---|
| Example 56 | STYRONAL ® ND656 available from BASF Tg = 18° C. AV = 12.1 | 0:1 | 1.4 | 0.65 |
| Example 57 | | 0.02:1 | 1.12 | 0.6 |
| Example 58 | STYRONAL ® ND811 available from BASF Tg = 63° C. AV = 19.9 | 0:1 | 1.86 | 0.69 |
| Example 59 | | 0.02:1 | 1.62 | 0.77 |

This example illustrates that the inclusion of ZnO crosslinkers in carboxylated styrene-butadiene rubber overcoat formulations can improve OTR and WVTR.

Example 6

Figure 3:
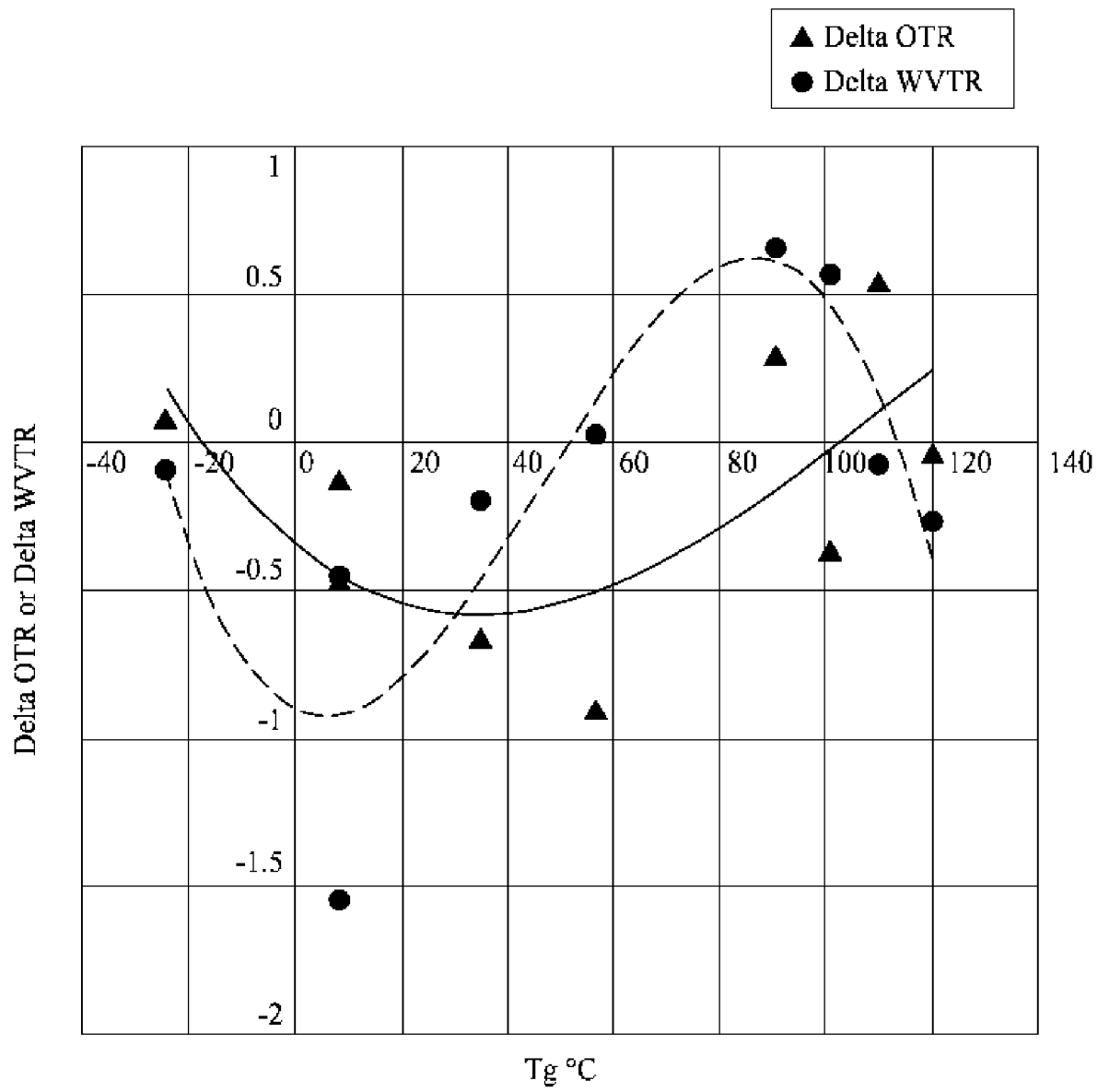
FIG. 3 is a plot of the change in oxygen transmission rate (OTR) and water vapor transmission rate (WVTR) (with zinc value minus without zinc value) as a function of the glass transition temperature ($T_g$) of the polymer in the overcoat formulation.
Figure 4:
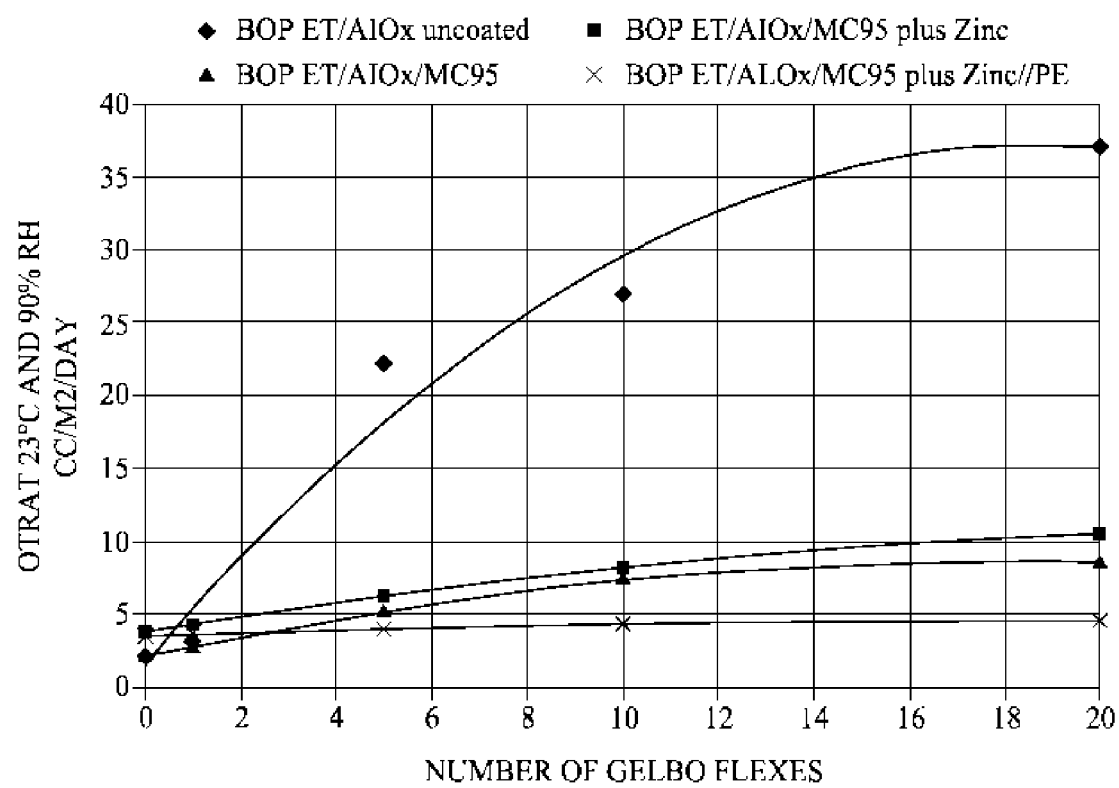
FIG. 4 is a plot of the change of oxygen transmission rate as a function of Gelbo flexes for uncoated BOPET/AlOx and for overcoated BOPET/AlOx.

Some of the data from the foregoing examples were compiled into FIG. 3, which is a plot of the change in OTR and WVTR (with zinc value minus without zinc value) as a function of the $T_g$ of the polymer in the overcoat formulation. Delta values that are negative indicate an improvement in OTR or WVTR. The solid line is the fit to OTR, and the dashed like is the fit to WVTR. Preferably, the polymer in the overcoat formulation has a Tg of −20° C. to 100° C., more preferably −10° C. to 50° C., and most preferably −10° C. to 35° C.

Example 6

In addition to the water resistance test used in Tables 3 and 4 a 30-minute exposure Cobb test ASTM D-3285 (TAPPI T-441) was also conducted using some of the polymers to show their levels of hydrophobicity (Table 10). To do this test a heavy coat weight of the polymer is applied to a paper surface. The absorption of water by the paper over a given surface area in 30 minutes is recorded in grams per square meter. The lower the number the greater the hydrophobicity.

TABLE 10

Cobb Values of polymers applied at 60 micron wet coating
weight onto Kraft liner paper (250 micron)

| Polymer | Tg | Cobb value (gsm) |
|---|---|---|
| SACE1 | 7° C. | 13.0 |
| SACE2 | <3° C. | 20.5 |
| SACE3 | 9° C. | 8.5 |
| JONCRY ™ 90 | 110° C. | 172.0 |

TABLE 10-continued

Cobb Values of polymers applied at 60 micron wet coating weight onto Kraft liner paper (250 micron)

| Polymer | Tg | Cobb value (gsm) |
|---|---|---|
| JONCRY ™ 1674 | −24° C. | 13.5 |
| MICHEM ® Coat 95 | 8° C. | 11.5 |
| JONCRY ™ 77 | 35° C. | 16.1 |

It can be seen that in all cases except where the Tg is very high we obtain low cobbs and hydrophobic coatings. The high Tg gives a polymer which doesn't film form completely which accounts for its poor Cobb value.

Example 7

Gelbo flex testing (ASTM F392-11(2015)) measures the flex durability of flexible packaging materials. The flex durability can be quantified as the resistance of the barrier material against repetitive strain. The major drawback of AlOx coatings is how easily they are damaged by such flexing. Several of the examples on BOPET coated AlOx were subjected to 1, 5, 10, and 20 flexes. Then, the oxygen transmission rate was measured after flexing. Compared to the uncoated AlOx coated films all the examples showed an improvement in maintaining barrier with flexing, Table 11.

TABLE 11

Oxygen transmission rate deterioration with number of Gelbo flexes

| Example coating applied to BOPET/AlOx | Gelbo flexes | OTR cc/m²/day at 90% RH and 23° C. |
|---|---|---|
| None | 0 | 2.06 |
| | 1 | 3.16 |
| | 5 | 22.24 |
| | 10 | 26.96 |
| | 20 | 37.30 |
| MICHEM ® Coat 95 | 0 | 2.36 |
| | 1 | 2.76 |
| | 5 | 4.66 |
| | 10 | 7.62 |
| | 20 | 8.50 |
| Example 22 | 0 | 4.10 |
| | 1 | 4.30 |
| | 5 | 5.96 |
| | 10 | 8.44 |
| | 20 | 10.50 |
| Example 22 laminated to a polyethylene carrier film | 0 | 3.3 |
| | 1 | 3.74 |
| | 5 | 3.92 |
| | 10 | 4.3 |
| | 20 | 4.58 |

Unless otherwise indicated, the disclosure of any ranges in the specification and claims are to be understood as including the range itself and also anything subsumed therein, as well as endpoints.

It will be apparent to those skilled in the art that modifications and variations can be made to the embodiments described herein without departing from the spirit and scope of the claimed subject matter. Thus it is intended that the specification cover the modifications and variations of the various embodiments described herein provided such modifications and variations come within the scope of the appended claims and their equivalents.

The invention claimed is:

1. A coated film structure comprising:
a substrate layer comprising a polymer film substrate;
an overcoat layer comprising at least one hydrophobic styrene copolymer;
at least one intermediate layer disposed between the substrate layer and the overcoat layer, the intermediate layer comprising aluminum oxides; and
at least one coating layer disposed between the at least one intermediate layer and the substrate layer.

2. The coated film structure of claim 1, wherein the polymer film substrate comprises a polymer selected from the group consisting of a polyester, a polyamide, and a polyolefin.

3. The coated film structure of claim 2, wherein the polymer is selected from the group consisting of polylactic acid (PLA), polyethylene terephthalate (PET), biaxially oriented polyethylene terephthalate (BOPET), oriented polypropylene (OPP), biaxially oriented polypropylene (BOPP), cast polypropylene (CPP), polyethylene (PE), and biaxially oriented polyamide.

4. The coated film structure of claim 1, wherein the coated film structure has an oxygen transmission rate of less than about 3.00 cm3/m2/day at 50% relative humidity at 23° C.

5. The coated film structure of claim 1, wherein the coated film structure has an oxygen transmission rate of less than about 2.00 cm3/m2/day at 50% relative humidity at 23° C.

6. The coated film structure of claim 1, wherein the coated film structure has a water vapor transmission rate of less than 2.50 g/m2/day at 90% relative humidity and 37.8° C. as measured in accordance with ASTM E-398.

7. The coated film structure of claim 1, wherein the overcoat layer has a glass transition temperature (Tg) of less than 110° C.

8. The coated film structure of claim 1, wherein the overcoat layer has a glass transition temperature (Tg) of −20° C. to 100° C.

9. The coated film structure of claim 1, wherein the overcoat layer has a glass transition temperature (Tg) of −10° C. to 50° C.

10. The coated film structure of claim 1, wherein the overcoat layer has a glass transition temperature (Tg) of −10° C. to 30° C.

11. The coated film structure of claim 1, wherein the hydrophobic styrene copolymer is selected from the group consisting of styrene-acrylic copolymers stabilized with alkali-soluble resins (ASR), alkali-soluble acrylic copolymers, acid functional styrene-acrylic copolymers, and carboxylated styrene-butadiene rubbers (SBR).

12. The coated film structure of claim 1, wherein the overcoat layer further comprises a multivalent cation.

13. The coated film structure of claim 12, wherein the multivalent metal cation comprises a transition metal ion.

14. The coated film structure of claim 13, wherein the transition metal ion is selected from the group consisting of ions of zinc, zirconium, iron, and copper.

15. The coated film structure of claim 14, wherein the transition metal ion is present from about 0.1:10 to about 7:10.

16. The coated film structure of claim 1, wherein the coating layer has a dry coat weight from about 0.5 g/m2 to about 1.5 g/m2.

17. The coated film structure of claim 1, wherein the hydrophobic styrene copolymer comprises from about 10 wt % to about 99 wt % styrene and from about 1 wt % to about 90 wt % acrylic.

18. The coated film structure of claim 1, wherein the hydrophobic styrene copolymer has a molecular weight from about 2,000 g/mol to about 17,000 g/mol.

19. The coated film structure of claim 18, wherein the hydrophobic styrene copolymer has an acid value from about 2 mgKOH/g to about 240 mgKOH/g.

20. The coated film structure of claim 1, wherein the overcoat layer further comprises a biocide.

\* \* \* \* \*